(12) United States Patent
Prontack et al.

(10) Patent No.: US 9,964,218 B2
(45) Date of Patent: May 8, 2018

(54) LINE BLIND VALVE

(71) Applicants: Ryan Joseph Prontack, Nanaimo (CA); John Lawrence Keen, Nanaimo (CA); Kyle Halliday, Kelowna (CA)

(72) Inventors: Ryan Joseph Prontack, Nanaimo (CA); John Lawrence Keen, Nanaimo (CA); Kyle Halliday, Kelowna (CA)

(73) Assignee: EVERGREEN MECHANICAL DESIGN LTD., Nanaimo, BC (CA)

( * ) Notice: Subject to any disclaimer, the term of this patent is extended or adjusted under 35 U.S.C. 154(b) by 0 days. days.

(21) Appl. No.: 15/037,044

(22) PCT Filed: Nov. 17, 2014

(86) PCT No.: PCT/CA2014/000830
§ 371 (c)(1),
(2) Date: May 16, 2016

(87) PCT Pub. No.: WO2015/070338
PCT Pub. Date: May 21, 2015

(65) Prior Publication Data
US 2016/0298775 A1 Oct. 13, 2016

Related U.S. Application Data

(60) Provisional application No. 61/904,764, filed on Nov. 15, 2013, provisional application No. 61/963,693, filed on Dec. 12, 2013.

(51) Int. Cl.
*F16L 55/10* (2006.01)
*F16K 3/312* (2006.01)

(52) U.S. Cl.
CPC .................................. *F16K 3/312* (2013.01)

(58) Field of Classification Search
USPC ......................................... 138/94, 94.3, 94.5
See application file for complete search history.

(56) References Cited

U.S. PATENT DOCUMENTS

| | | | | | |
|---|---|---|---|---|---|
| 1,998,080 | A | * | 4/1935 | Gerlich | F16K 3/10 138/94.5 |
| 2,558,247 | A | * | 6/1951 | Hamer | F16K 3/312 138/94.3 |
| 2,664,918 | A | * | 1/1954 | Hamer | F16K 3/20 138/94.3 |
| 2,709,455 | A | * | 5/1955 | Greenwood | F16K 3/312 138/94.3 |
| 2,800,926 | A | * | 7/1957 | Handley | F16K 3/312 138/44 |
| 2,931,394 | A | * | 4/1960 | Hamer | F16K 37/0008 138/94.5 |

(Continued)

*Primary Examiner* — James Hook
(74) *Attorney, Agent, or Firm* — Stephen R. Burri; Island IP Law

(57) ABSTRACT

The invention is an improved line blind valve which provides absolute positive flow shut-off in piping systems. It uses fluid pressure to separate the seal surfaces while ensuring the end connections do not move relative to each other. Once separated, the blind can be moved easily into either the closed blind position or the open full flow position. The assembly consists of an outer housing, two end pipes and a sliding carrier that allows a blind to be either inserted into the flow or removed by pivoting the blind about a pin.

8 Claims, 6 Drawing Sheets

(56) References Cited

U.S. PATENT DOCUMENTS

| | | | | |
|---|---|---|---|---|
| 5,413,096 A | * | 5/1995 | Hart | A62B 9/02 128/201.28 |
| 5,660,199 A | * | 8/1997 | Maichel | F16L 41/06 137/15.12 |
| 2003/0056843 A1 | * | 3/2003 | Carey | F16L 23/003 138/94.3 |

* cited by examiner

LINE BLIND VALVE

FIELD OF THE INVENTION

The present invention relates to piping systems. In particular, the present invention relates to line blind valves for providing absolute positive flow shut-off in piping systems.

BACKGROUND OF THE INVENTION

Line blind valves have been in use since the 1950's and there are several varieties available that fall into one of two categories, line spreading or non line-spreading. Line blind valves that spread the piping system to release the spectacle blind typically require that a series of bolts be turned, either with a wrench or bar, to jack the seal surfaces apart. This style of valve can be labour intensive and cause significant unwanted stresses in the piping system.

Non line-spreading valves are available in two main designs, the first uses a cammed or threaded pinion gear to separate the sealing surfaces and allow repositioning of the spectacle blind. This design requires many moving parts and is typically operated by a handwheel. The second design uses a gate that passes through resilient seats to either allow full flow or activate the line blind. This design is subject to wear of the sliding seals and cannot withstand high pressures or temperatures.

There are several line blinds known in the prior art, but each has disadvantages over the present invention. Some of the prior art devices have the disadvantage of requiring line spreading or use face seals. Others use hand wheel actuation, which increases the weight, cost, and labour requirement for the blind valve. Still other prior art blind valves are large, have many moving parts, are vulnerable to exposure to the elements, and are expensive to actuate.

BRIEF DESCRIPTION OF THE DRAWINGS

It is to be expressly understood that the description and drawings are only for the purpose of illustration and as an aid to understanding, which are not intended as a definition of the limits of the invention. Embodiments of the invention are shown by way of example only in the accompanying drawings, in which.

DETAILED DESCRIPTION OF THE INVENTION

According to the present invention, existing line blind valve designs can be improved by using hydraulic or pneumatic fluid pressure to release the sealed surfaces of a non line-spreading valve. This method of actuation allows for a simpler design requiring fewer parts that is more easily fabricated and assembled. In addition, seal surfaces in the line blind of the present invention have been improved to provide radial seals which are less susceptible to process fluid leaks than standard face seals. The fully enclosed design also protects the valve from contamination better than existing product designs.

Figure 1:
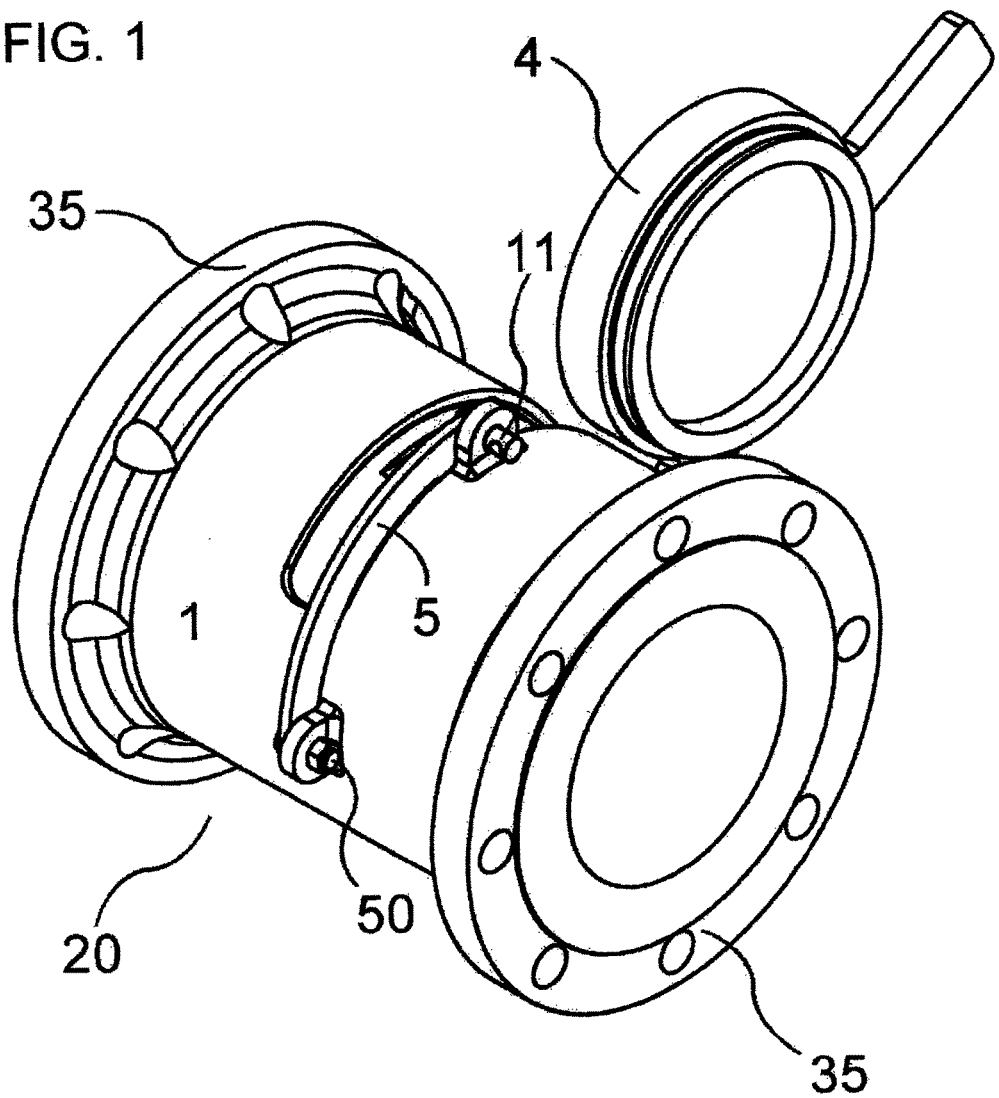
FIG. 1 is a three dimensional view of the blind valve of the present invention, showing the exterior, with the blind in the open position.
Figure 3:
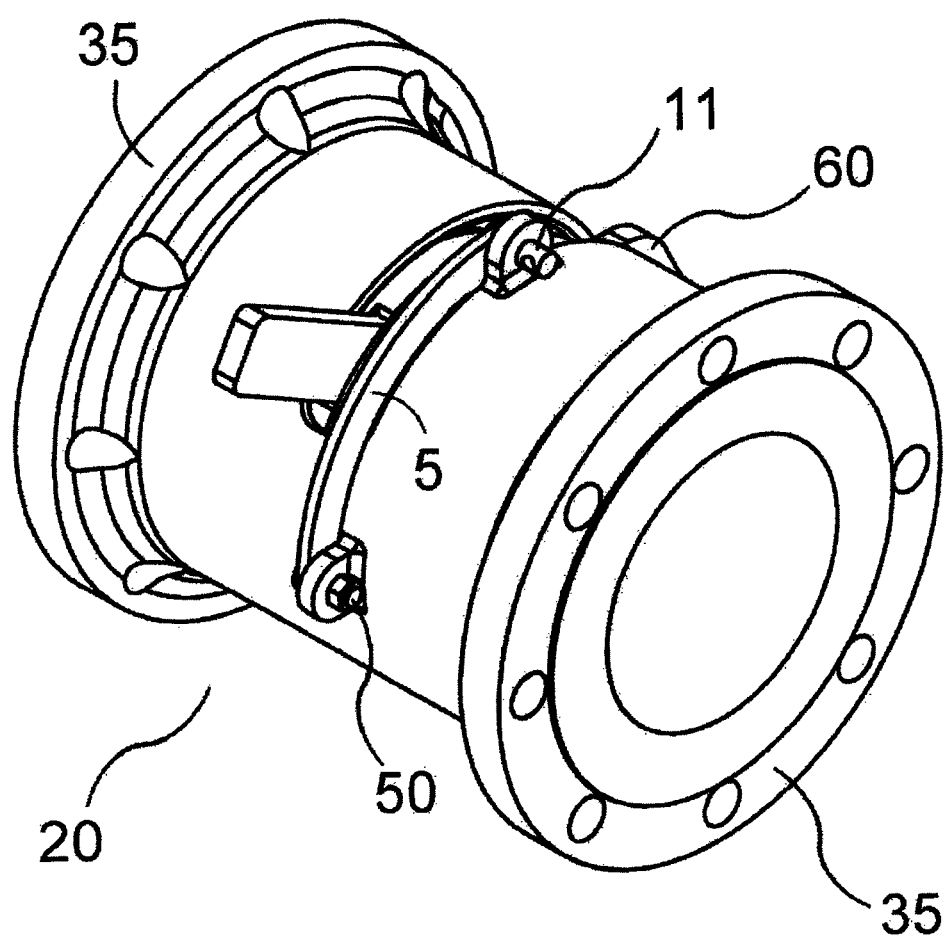
FIG. 3 is a three dimensional view of the blind valve of the present invention, showing the exterior, with the blind in the closed position.

Referencing FIG. 1, the blind valve 20 is shown in the open position which allows fluid to flow through the valve. FIG. 3 depicts the blind valve in the closed position which prevents fluid flow through the valve.

Figure 2:
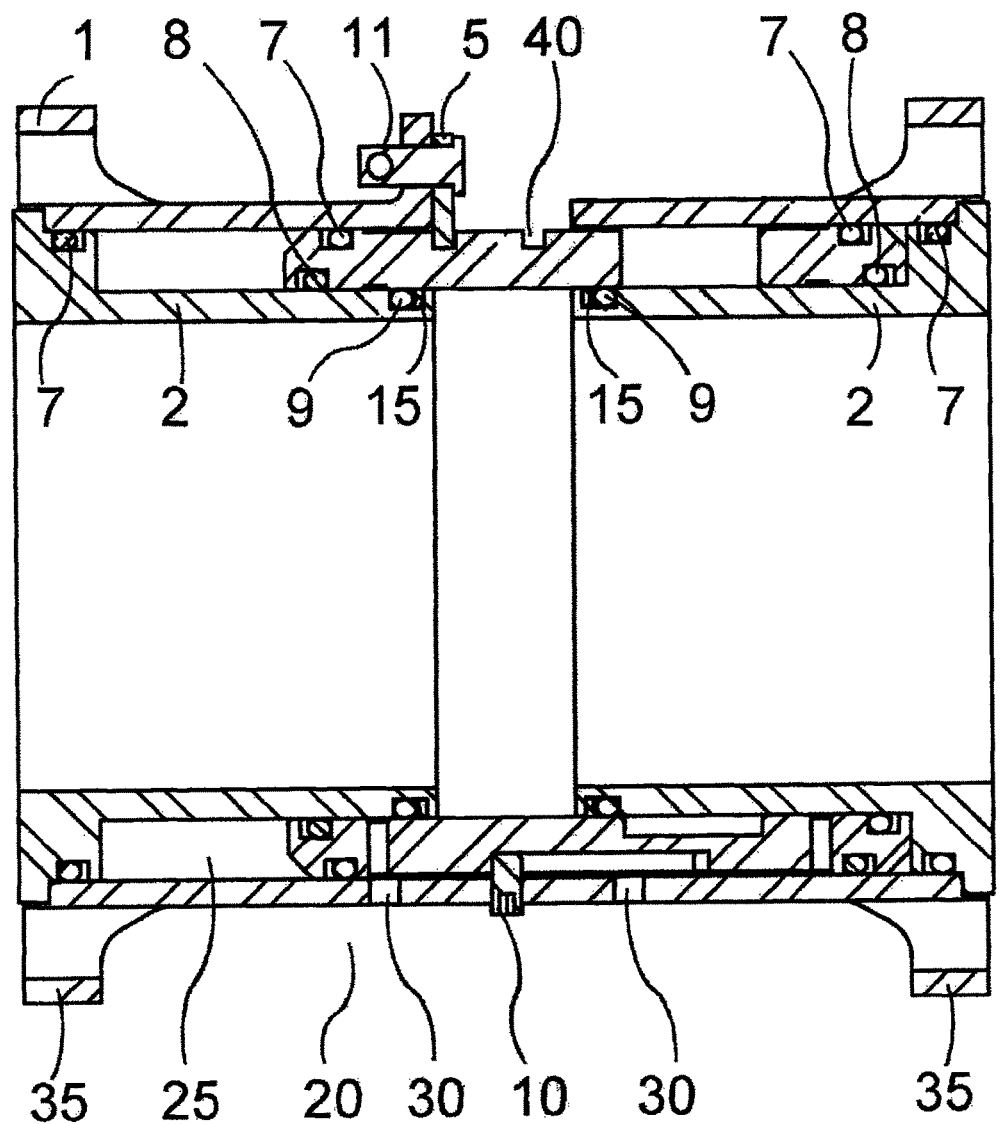
FIG. 2 is a cross-sectional view along the longitudinal axis of the valve with the blind in the open position.
Figure 4:
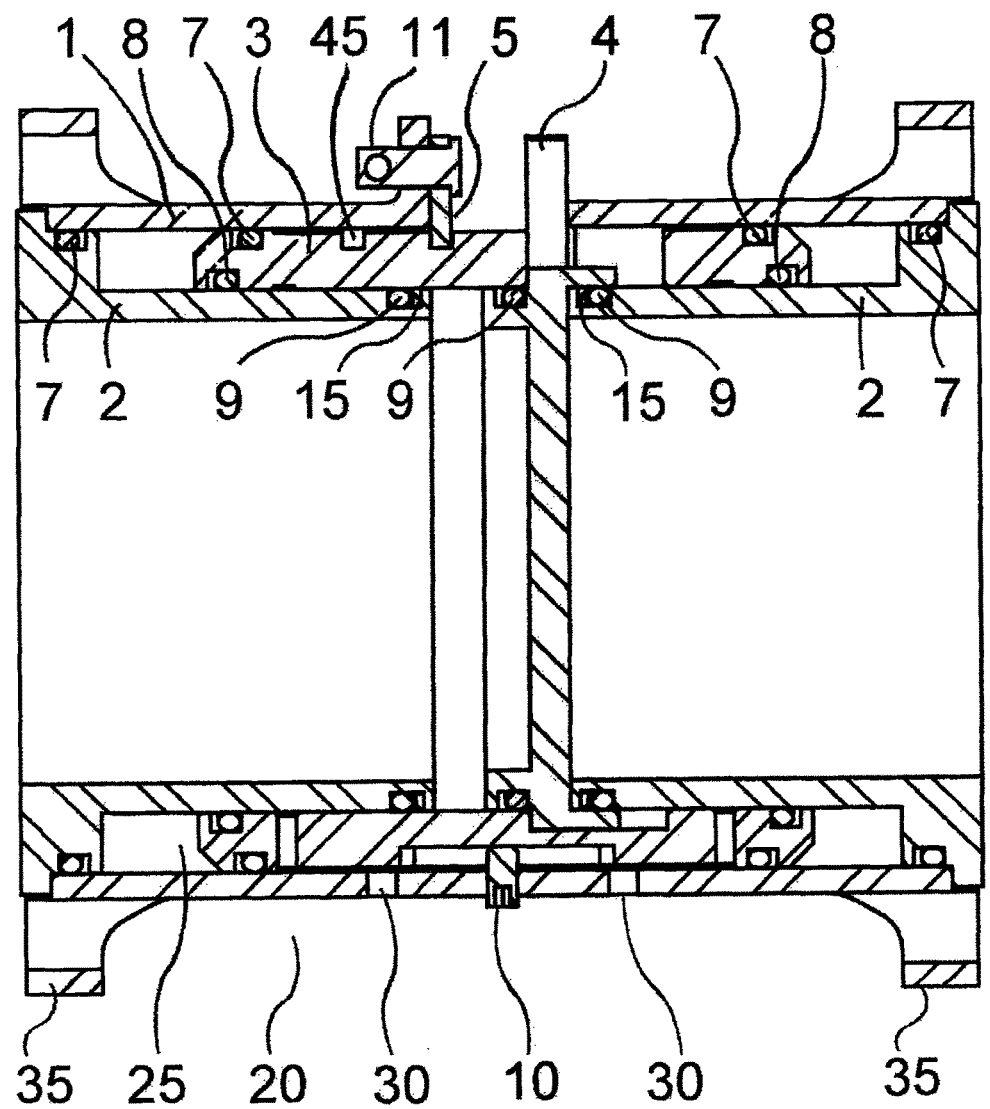
FIG. 4 is a cross-sectional view along the longitudinal axis of the valve with the blind in the closed position.
Figure 5:
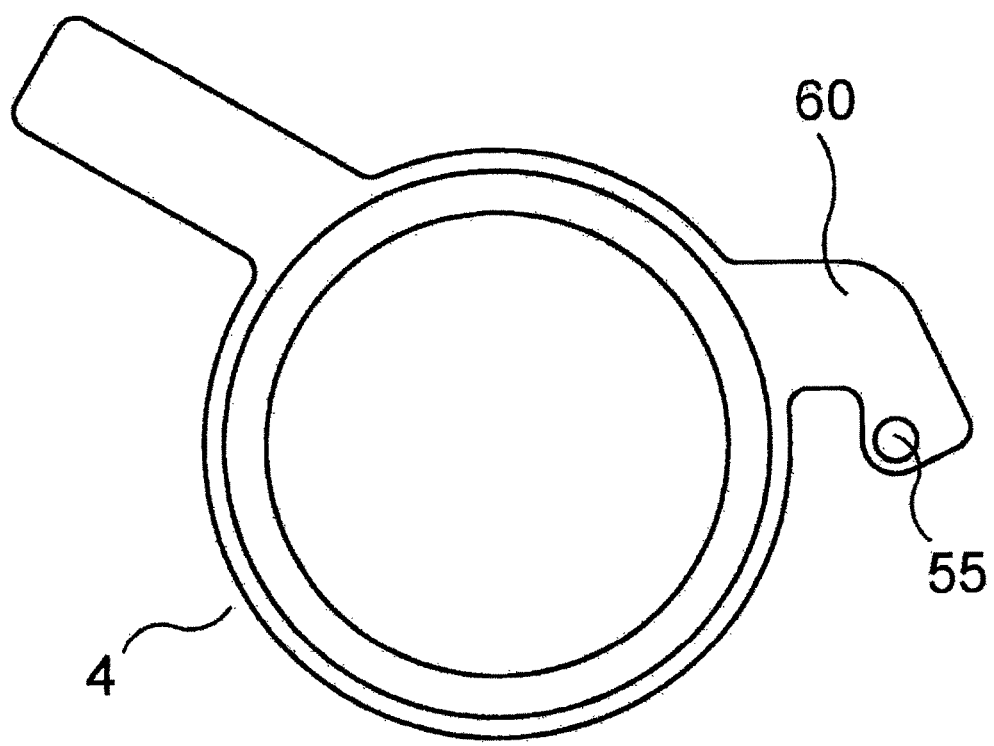
FIG. 5 is a cross-sectional view of the blind of the present invention.

Referencing FIGS. 2 and 4, the line blind valve is comprised of an outer housing 1 and two symmetrical end pipes 2. Within the valve when fluid pressure is provided to a first fluid port 6, a carrier 3 is moved from the open position (right) to the closed position (left) in a cavity 25 formed between the outer housing and the end pipes. Once the resulting line opening is available the blind 4 may be rotated into position either manually or by other means of actuation. The carrier may be pressurized through a second fluid port 12 to seat the blind in position, resulting in sealing at O-ring seals 9. A backup ring 15 may be disposed adjacent each of the O-ring seals 9 to protect the O-rings through scraping. In FIG. 2, the blind is rotated into the open position, while FIG. 4 depicts the blind in the closed position. Flanged end connections 35 integral to the outer housing 1 permit connection of the valve to the piping system.

O-ring seals 8 prevent process fluid from escaping while seals 7 prevent hydraulic fluid or air from entering the process or the atmosphere. One or more leak detection ports 30 in the outer housing provide a means of external identification of the presence of a fluid leak from the valve.

Figure 6:
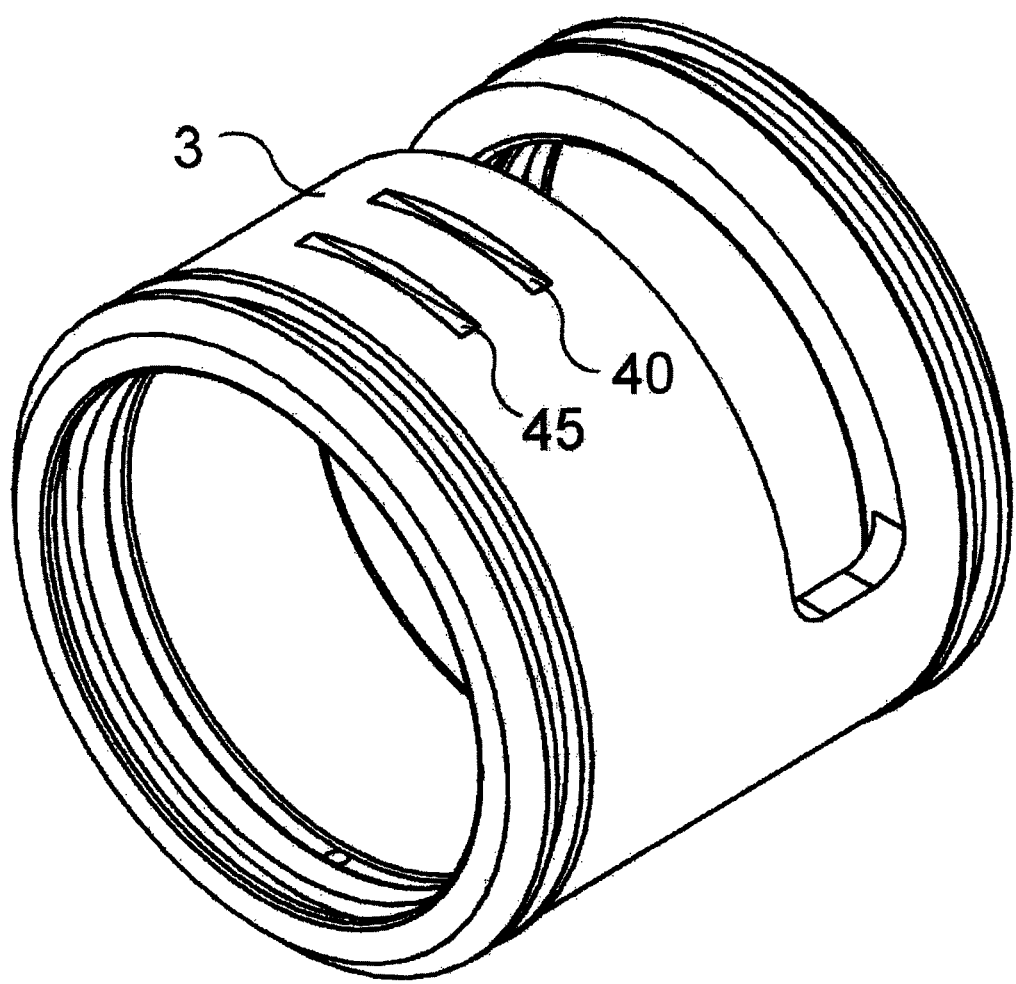
FIG. 6 is a three dimensional view of the blind carrier of the present invention.

The blind 4 may be locked in either the open position shown in FIGS. 1 and 2, or the closed position shown in FIGS. 3 and 4 using lock-out recesses 40, 45 depicted in FIG. 6, making it either fit for process operation or fit for maintenance depending on the position selected. The locking arm 5 may be set into either lock-out recess and the locking pin 11 may be locked to ensure the blind is only operated by approved personnel.

A lock arm pivot bolt 50 ensures correct alignment of the locking arm 5, and a blind pivot bolt (not shown) insertable through an opening 55 in the blind pivot arm 60 ensures correct alignment of the blind. A locking pin 10 ensures correct alignment of the carrier 3 within the outer housing.

The line blind of the present invention offers numerous advantages over the prior art. It has a simple construction which may be manufactured at relatively low cost in comparison with prior art technologies. The present invention provides radial seals rather than face seals. Less manual input is required due to the unique hydraulic or pneumatic actuation. A spectacle is not required due to the dual purpose Carrier that acts as both the sealing surface for the Blind in the closed position and as the pipe wall in the open position. Finally, the present invention provides a more enclosed design, in contrast with prior art systems, making is less susceptible to external fouling.

It will be appreciated by those skilled in the art that other variations of the preferred embodiment may also be practiced without departing from the scope of the invention.

The invention claimed is:

1. A line blind valve for a pressurized fluid piping system, the line blind valve comprising:
   a cylindrical outer housing having opposed first and second ends, a medially positioned radial opening, and connection means for a blind pivot arm;
   a first cylindrical end pipe disposed within the first end of the outer housing;

a second cylindrical end pipe disposed within the second end of the outer housing;

a cavity defined by a radial space between the outer housing and the end pipes;

a carrier disposed within the cavity, the carrier slidable between a closed position and an open position;

carrier actuating means for sliding the carrier between the closed position and the open position;

a blind having a pivot arm connectable to the outer housing, the blind rotatable about the distal end of the pivot arm between a closed position concentric with the outer housing and an open position external to the outer housing, the blind having an O-ring seal near the outer circumference of each face of the blind;

a plurality of seals on the carrier and the inner housing components for preventing escape of fluids from the piping system; and end connection means for connecting the blind valve to the fluid piping system.

2. The blind valve of claim 1, wherein the carrier actuating means comprises a first fluid port proximal to the first end of the outer housing through the outer housing into the cavity for sliding the carrier into the open position, and a second fluid port proximal to the second end of the outer housing through the outer housing into the cavity for sliding the carrier into the closed position.

3. The blind valve of claim 1, further comprising a lock-out arm pivotally connected to the outer housing, and a pair of parallel radial lock-out recesses in the outer surface of the outer housing for maintaining the blind in an open position for process operation or in a closed position for maintenance operation.

4. The blind valve of claim 1, further comprising one or more leak detection ports through the outer housing.

5. The blind valve of claim 1, further comprising a backup rings adjacent each of the O-ring seals of the blind.

6. A method of preparing a piping system for maintenance using the line blind valve of claim 1, the method comprising the steps of:

applying fluid into a first fluid port of a blind valve to slide a blind carrier into an open position;

pivoting a blind into a closed position concentric with the blind valve; and applying fluid into a second fluid port of a blind valve to slide a blind carrier into a closed position to seal the blind.

7. The method of claim 6, further comprising the additional step after step (c) of locking of a lock-out arm adjacent the blind to prevent opening of the blind.

8. A method of using the line blind valve of claim 1, the method comprising the steps of:

applying fluid into a first fluid port of a blind valve to slide a blind carrier into an open position;

pivoting a blind into a closed position concentric with the line;

applying fluid into a second fluid port of a blind valve to slide a blind carrier into a closed position to seal the blind within the line;

carrying out line maintenance;

applying fluid into the first fluid port of a blind valve to slide the blind carrier into the open position;

pivoting the blind into an open position external to the line; and applying fluid into the second fluid port of the blind valve to slide the blind carrier into the closed position to seal the valve.

* * * * *